United States Patent [19]

Bist et al.

[11] Patent Number: 5,404,167
[45] Date of Patent: Apr. 4, 1995

[54] SUBBAND COLOR VIDEO CODING USING A REDUCED MOTION INFORMATION SUBBAND

[75] Inventors: Anurag Bist, Honolulu, Hi.; Arnaud E. Jacquin, New York, N.Y.

[73] Assignee: AT&T Corp., Murray Hill, N.J.

[21] Appl. No.: 30,516

[22] Filed: Mar. 12, 1993

[51] Int. Cl.[6] .............................................. H04N 7/13
[52] U.S. Cl. .................................... 348/398; 348/391
[58] Field of Search ............... 348/398, 397, 393, 392, 348/391, 390, 384; H04N 7/13

[56] References Cited

U.S. PATENT DOCUMENTS

| | | | |
|---|---|---|---|
| 4,817,182 | 3/1989 | Adelson et al. | 348/398 |
| 5,214,502 | 5/1993 | Stone et al. | 348/398 |
| 5,216,719 | 6/1993 | Oh | 381/36 |
| 5,218,435 | 6/1993 | Lim et al. | 358/133 |
| 5,223,926 | 6/1993 | Stone et al. | 358/133 |
| 5,235,421 | 8/1993 | Yang | 358/141 |
| 5,309,232 | 5/1994 | Hartung et al. | 348/384 |

OTHER PUBLICATIONS

Gharavi, Hamid and Ali Tabatabai, "Sub-Band Coding of Monochrome and Color Images", IEEE Transactions on Circuits and Systems, vol. 35, No. 2, Feb. 1988, pp. 207–214.
U.S. patent application Ser. No. 07/832,256 filed Feb. 7, 1992.
T. A. Welch, "A Technique for High Performance Data Compression," vol. 17, No. 6, *IEEE Computer Mag.*, 8–19 (Jun. 1984).
G. Karlsson and M. Vetterli, "Three Dimensional Subband Coding of Video," *Proceedings ICASSP'88*, 1100–1103 (1988) month not avail.
J. D. Johnston, "A Filter Family Designed for Use in Quadrature Mirror Filter Bands," *Proceedings ICASSP'80*, 291–294 (1980) month not avail.

Primary Examiner—Howard W. Britton
Assistant Examiner—Bryan S. Tung
Attorney, Agent, or Firm—Thomas A. Restaino; Kenneth M. Brown

[57] ABSTRACT

A technique for coding color components of video signals wherein a color component of an image signal sequence is filtered into a plurality of subband image signals. One or more pixels of a first subband image signal are coded using one or more bits of a first quantity of bits. The first subband image signal reflects an image structure of a color component of the image signal sequence. The first subband includes low spatial and temporal frequencies of the color component. A second quantity of bits is used for coding one or more pixels of a second subband image signal. This second quantity of bits comprises one or more bits of the first quantity of bits not used in coding pixels of the first subband image signal. One or more pixels of the second subband image signal are coded using one or more of the second quantity of bits. The second subband image signal reflects image object motion information of the color component of the image signal sequence. A third quantity of bits is provided for use in coding one or more pixels of a third subband image signal. The third quantity of bits comprises one or more bits not used in coding either the first or second subband image signals. One or more pixels of the third subband image signal are coded with one or more of the third quantity of bits. The third subband image signal reflects edges of moving image objects, such as horizontal or vertical edges.

11 Claims, 3 Drawing Sheets

SUBBAND COLOR VIDEO CODING USING A REDUCED MOTION INFORMATION SUBBAND

FIELD OF THE INVENTION

This invention relates to the efficient digital coding of color video signals at low rates where the rate is fixed for each video frame.

BACKGROUND OF THE INVENTION

Good quality, low bit rate color video coding is required for such applications as video teleconferencing over existing and future networks, as well as CD-ROM storage. An effective low rate coder should remove the redundancies due to temporal and spatial correlations along with perceptually irrelevant components of an image sequence.

Subband digital coding techniques are well known in the art. See, e.g., N. S. Jayant and P. Noll, Digital Coding of Waveforms: Principles and Applications to Speech and Video (1984).

Subband coding techniques have been used for image coding in a three-dimensional spatio-temporal subband framework as described in G. Karlsson and M. Vetterli, *Three Dimensional Subband Coding of Video*, Proceedings ICASSP (1988), 1100–1103. The technique described there employs multidimensional filtering to generate spatio-temporal frequency bands or subbands using so called quadrature mirror filters. These latter filters are described, e.g., in J. D. Johnston, *A Filter Family Designed for Use in Quadrature Mirror Filter Bands*, Proceedings ICASSP (1980).

SUMMARY OF THE INVENTION

The present invention takes advantage of a three-dimensional subband framework by providing a technique for coding a color component of an image signal sequence with use of a first quantity of bits. The color component may be, for example, the U or V component of the standard YUV color video format. The image signal sequence comprises a plurality of image signals.

According to an illustrative embodiment of the invention, a color component of an image signal sequence is filtered into a plurality of subband image signals with use of a three-dimensional subband filter bank. One or more pixel signals ("pixels") of a first subband image signal are coded using one or more bits of the first quantity of bits. The first subband reflects the original image structure.

A second quantity of bits is provided for coding one or more pixels of a second subband image signal. The second quantity of bits comprises one or more bits of the first quantity which were not used in coding pixels of the first subband image signal. The second subband reflects motion information of objects in the color component of the image signal sequence. The one or more pixels of the second subband image signal are coded with one or more bits of the second quantity.

According to the illustrative embodiment, a third quantity of bits is provided for coding one or more pixels of additional subband image signals. This third quantity of bits comprises one or more bits not used in coding pixels of either the first or second subbands. In addition, this third quantity may be shared for use in coding pixels of more than one subband. For example, one or more bits of this third quantity of bits may be used to code one or more pixels of subband image signals reflecting substantially vertical and horizontal edges of moving image objects, respectively.

DETAILED DESCRIPTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example, the functions of processors presented in FIG. 1 may be provided by a single shared processor. (Use of the term "processor" should not be construed to refer exclusively to hardware capable of executing software.)

Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

Figure 1:
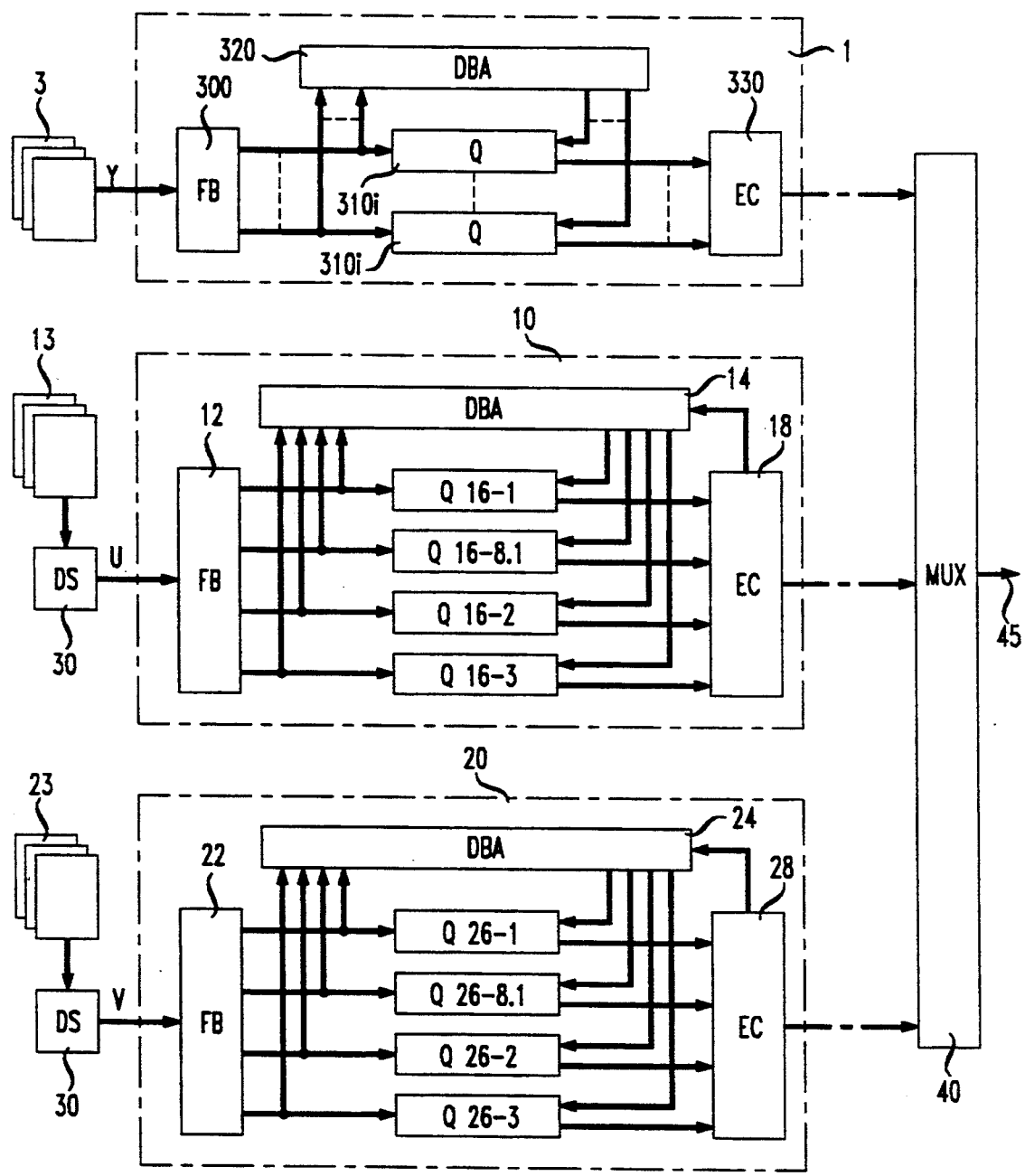
FIG. 1 presents an illustrative digital image coder embodiment of the present invention.

FIG. 1 presents an illustrative digital color image coder embodiment according to the present invention. The embodiment receives video signals in the standard YUV color video format at a rate of 15 frames per second and codes the signals for transmission over channel 45 to a receiver/decoder. The YUV color video format comprises three signal components: one component (designated the "Y" component) representing luminance (or gray scale) video information, and two components (designated the "U" and "V" components) representing chrominance (or color) video information. The embodiment of FIG. 1 includes three coding sections 1, 10, and 20 corresponding to the three components of the YUV color video format. The coded output of each section 1, 10, and 20 is provided to multiplexer which combines the output in conventional fashion for application to channel 45. The total bandwidth available to the embodiment for communication of video over channel 45 is 368 kilobits per second (kbps) (an additional 16 kbps is available to code speech/audio information). Channel 45 may comprise a telecommunications network and/or a storage medium.

Section 1 of the embodiment receives a sequence of luminance frames 3 for coding. Each frame is a luminance image of the video sequence. Each such luminance frame comprises 240×360 pixel signals ("pixels"). For purposes of the present discussion, the sequence of luminance frames may be coded with, e.g., the first illustrative embodiment described in U.S. patent application Ser. No. 07/832,256, which application is incorporated by reference as if set forth fully herein. For purposes of consistency the numerals identifying components of the first coding section 1 are the same as those used in the referenced application. As described in the referenced application, coding section 1 employs adaptive bit allocation together with conditional replenishment and quantization based on PCM with a uniform quantizer or Geometric Vector Quantization (GVQ). Of the 368 kbps available to the embodiment, 328 kbps is reserved for luminance coding by section 1.

In addition to coding section 1, the embodiment of FIG. 1 comprises coding sections 10 and 20, each of which receives a sequence of chrominance frames for coding. As shown in the Figure, coding section 10 receives a sequence 13 of frames of the U component, while coding section 20 receives a sequence 23 of frames of the V component. Each frame of the U and V components received by coding sections 10 and 20 comprises 120×180 pixels. These frames are thus one-forth the size of the luminance frames. The reduced size of the chrominance frames is provided conventionally by down-samplers 30. Coding sections 10 and 20 each have available a total of 20 kbps bandwidth for coding the U and V components, respectively.

Coding sections 10 and 20 are identical in terms of their structure and operation. For purposes of clarity, the discussion of coding a sequence of chrominance frames will focus illustratively on section 10 and the U component. Nevertheless, what is described in terms of section 10 and the U component is applicable to section 20 and the V component.

Figure 2:
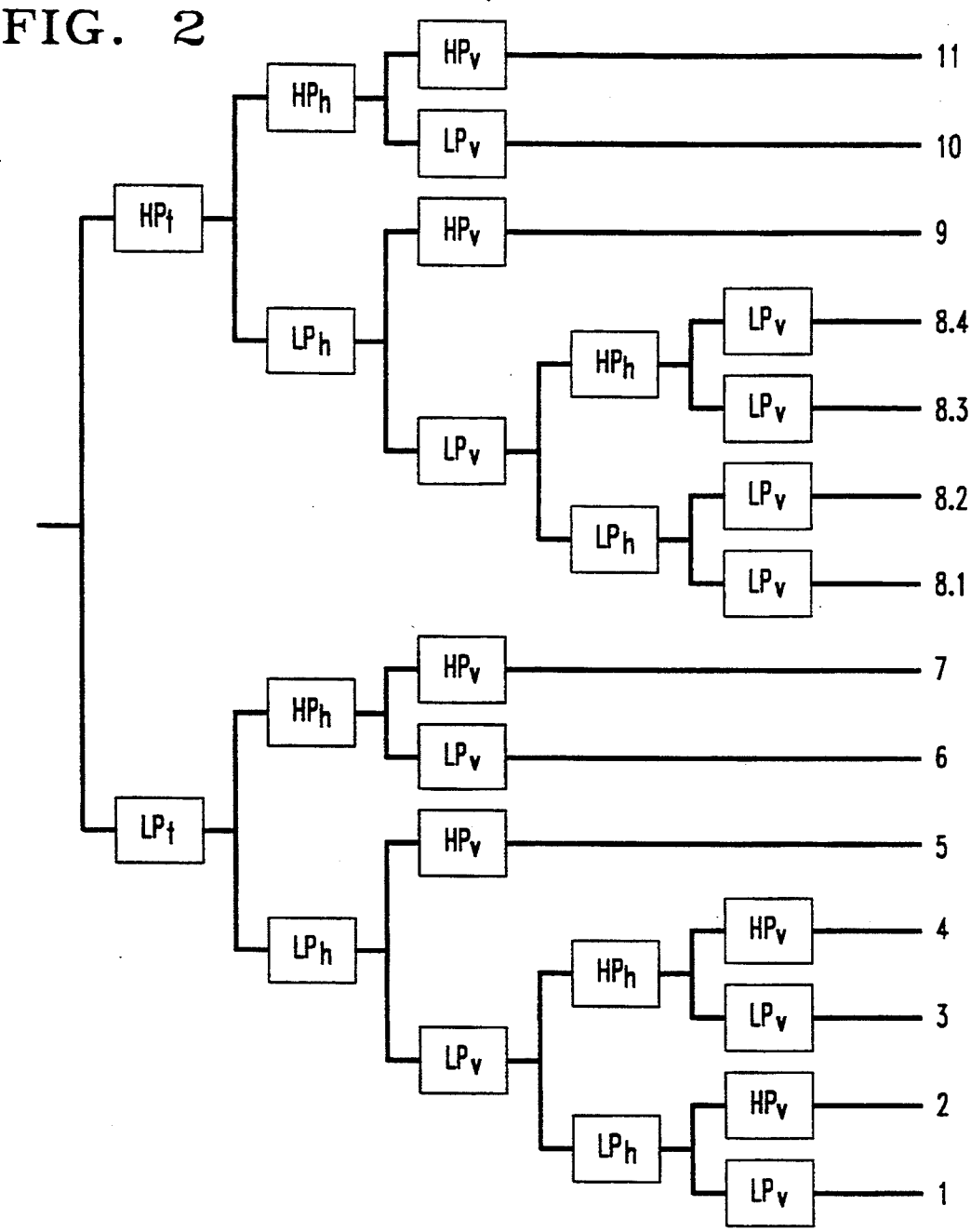
FIG. 2 presents an illustrative subband filter arrangement in accordance with the embodiment of FIG. 1.

Turning to the structure and operation of coding section 10, the sequence of down-sampled U frames are provided to subband filter bank 12. As shown in FIG. 2, filterbank 12 comprises a cascade of high-pass (HP) and low-pass (LP) temporal (t), horizontal spatial (h), and vertical spatial (v) filters. The two temporal filters, $HP_t$ and $LP_t$, of the illustrative filterbank 12 comprise 2-tap Haar filters. These filters operate by forming difference and average frame signals, respectively, of consecutive chrominance frames received by the filterbank 12. Filter bank 12 includes memory, e.g., RAM (not shown), coupled to the temporal filters, sufficient for storing frames of the chrominance signal sequence.

The vertical and horizontal spatial HP and LP filters which form the balance of the filterbank 12 comprise 10-tap one-dimensional quadrature mirror filters (QMFs), of the type described in J. D. Johnston, *A Filter Family Designed for Use in Quadrature Mirror Filter Banks*, Proceedings ICASSP (1980).

Figure 3:
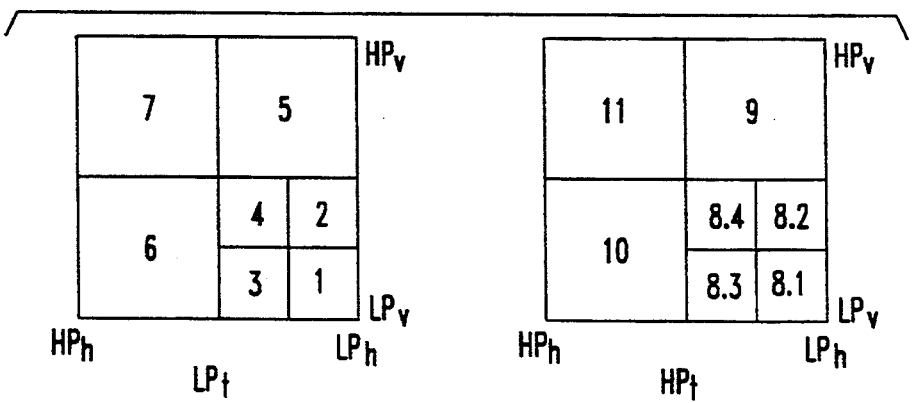
FIG. 3 presents a graphical representation of the subbands provided by the subband filter presented in FIG. 2.

The subband framework provided by filterbank 12 may be represented graphically as shown in FIG. 3. The large square on the left represents all subbands which are obtained from an initial low-pass temporal filtering. The individual subbands are numbered to correspond to those of FIG. 2. The large square on the right represents all subbands which are obtained from an initial high-pass temporal filtering. For each given set of subbands under high- or low-pass temporal filtering, the horizontal direction is indicative of horizontal spatial filtering (from high-pass on the left to low-pass on the right) and the vertical direction is indicative of vertical spatial filtering (from high-pass at the top to low-pass at the bottom). As in FIG. 2, the terms HP and LP refer to high-pass filtering and low-pass filtering respectively, while the subscripts t, h, and v refer to temporal, horizontal and vertical filtering respectively.

Each subband image contains temporal and spatial frequencies defined by the filterbank 12. According to the illustrative embodiment, certain high spario-temporal frequency subbands are discarded due to their general perceptual insignificance. Subbands 4, 5, 6, 7, 8.2, 8.3, 8.4, 9, 10, and 11 of FIG. 3 are discarded for this reason. Discarding this subband information causes no severe image quality distortion. In general, depending on the bit rate, quality sought, and subband framework, any number of high frequency subbands may be discarded. Those subband images not discarded are provided to quantizers 16 and bit allocation processor 14 of coding section 10.

Subband image quantization by quantizers 16 is performed responsive to an illustrative dynamic bit allocation (DBA) by DBA processor 14. DBA has two significant parts. The first part is the ordering of the remaining subbands based on their perceptual significance. In this regard, a subband reflecting the original image structure, such as the lowest spario-temporal frequency subband, i.e., subband 1, is treated as the most perceptually significant. As a result, subband 1 is coded in a very accurate fashion. All bits available for coding a frame of chrominance information are made available for coding this subband image (generally, a given image in subband 1 may be adequately coded using less than all available bits).

The next most significant subband for coding purposes is the motion subband (illustratively corresponding to subband 8.1 in FIG. 3). This subband is allocated all remaining bits (after the coding of subband 1) for encoding motion information (again, the coding of this subband may not actually require all such bits).

Any bits remaining after the coding of subbands 1 and 8.1 are used to encode subbands reflecting edge information, such as the high spatial/low temporal frequency subbands—illustratively, subbands 2 and 3. It will be understood by those of ordinary skill in the art that when the motion information is high, more bits are allocated to the motion subband and fewer are left to encode the high spatial details. When the motion information drops, more bits are left to encode the high spatial details.

The second part of the dynamic bit allocation is the location of significant pixels or groups (or "blocks") of pixels within each subband image to encode. In the illustrative embodiment, this is done either as pan of a technique called "conditional replenishment" (used in the coding of subband 1) or by choosing image pixels or groups of pixels with high energy (used in the coding of subbands 8.1, 2 and 3).

According to the first part of the illustrative DBA protocol, subband 1 is considered for coding first. Responsive to the conditional replenishment requirements of DBA, quantizer 16-1 will code only those pixels, x(i,j,t), of the subband image which satisfy the following conditional replenishment criterion:

$$|x(i,j,t) - x(i,j,t-1)| > T_{cr} \qquad (1)$$

where x(i,j,t) is a pixel of the ith row and jth column of a subband 1 frame at time t, while $T_{cr}$ is an empirically derived conditional replenishment scalar threshold. Those pixels which do not meet this requirement are not coded; rather, side information is generated for communication to the receiver to indicate that the receiver should use the immediate past value for this pixel as the current value for this pixel (the side information indicating which pixels are repeated from the previous frame and which pixels are quantized is sent to the entropy coder 18 for encoding). Thus, expression (1) provides an error threshold which seeks to determine which pixels need to be coded for accurate representation, and which pixel values may simply be repeated by the receiver/decoder (since the error which would be incurred in doing such repetition or "replenishment" is acceptable according to expression (1)). The choice for $T_{cr}$ determines how much of the subband data will be repeated from the previously encoded subband frame. Illustratively, $T_{cr}$ may take on values between 5 and 25. An illustrative conditional replenishment technique for a block of pixels is similar to the individual pixel approach. Should any pixel of the block meet the condition of equation (1), then the block is coded; otherwise the block is repeated by the receiver according to received side information.

Quantizers 16 comprise either uniform 6-bit scalar PCM quantizers of the type described by, e.g., Jayant and Noll, *Digital Coding of Waveforms: Principles and Applications to Speech and Video* (1984) (if coding scalar pixels), or a Geometric Vector Quantizers of the type described in U.S. patent application Ser. No. 07/832,526, which is incorporated by reference as if fully set forth herein (if coding blocks of pixels).

All quantized pixels from quantizer 16-1 are passed to entropy coder 18-10. The entropy coder 18-10 may be any lossless coder such as the adaptive Lempel-Ziv coder. See, e.g., T. A. Welch, *A Technique for High Performance Data Compression*, Vol. 17, No. 6, IEEE Computer Mag. 8-19 Jun. 1984. The number of bits that entropy coder 18 uses to encode the quantized pixels and conditional replenishment side-information is provided to DBA processor 14 to update the number of bits available for coding additional subbands.

The next subband encoded is a subband reflecting the motion of objects in an image sequence, such as a subband containing high temporal frequency components and low spatial frequency components. In the illustrative embodiment, this is subband 8.1. The signal energy in this subband gives a good indication of the amount of motion in the video sequence at any given time. Responsive to DBA processor 14, subband 8.1 is encoded by quantizing the pixels in blocks whose local energy exceeds a predetermined threshold value determined by DBA processor 14 as follows:

$$\frac{1}{N} \sum_{i,j} x(i,j,t)^2 \geq T_m, \quad (2)$$

where the summation is performed over the block of pixels, N denotes the block size (e.g., N=16), and $T_m$ is a predetermined scalar motion threshold value. For this example, $T_m$ may be set to 100. The pixel blocks in the motion subband whose average energy exceeds the threshold $T_m$ may be encoded by quantizer 16-8.1 using Geometric Vector Quantization with either 2 or 3 levels (described in the above-referenced U.S. patent application Ser. No. 07/832,526). The value of N is the GVQ vector size. If GVQ is not used, the individual pixels of these blocks may be encoded with scalar quantizers of the type discussed above. Pixels of blocks which do not satisfy equation (2) are not quantized or communicated to the receiver. Quantized pixel blocks and block-identifying side information are provided to entropy coder 18 for coding. The number of bits required to encode the quantized pixel blocks and corresponding side information is provided by entropy coder 18-10 to DBA processor 14 to update the number of bits available for coding additional subbands.

The subbands which are encoded last reflect the horizontal and vertical edge information of moving objects in an image sequence (typically, slowly moving objects). Illustratively, these are subbands corresponding to low temporal and high spatial frequency components. In the illustrative embodiment, these are subbands 2 and 3. Responsive to DBA processor 14, the bits which are left to encode subband information are distributed equally to subbands 2 and 3. In each subband, the pixel blocks with the largest local energy as defined in Eq. 2 are encoded. The blocks may be quantized using Geometric Vector Quantization or scalar quantization, as discussed above. Blocks will be quantized in order of decreasing block energy until there are insufficient bits left to continue block quantization. As before, quantized pixel block information is provided to entropy coder 18.

Figure 4:
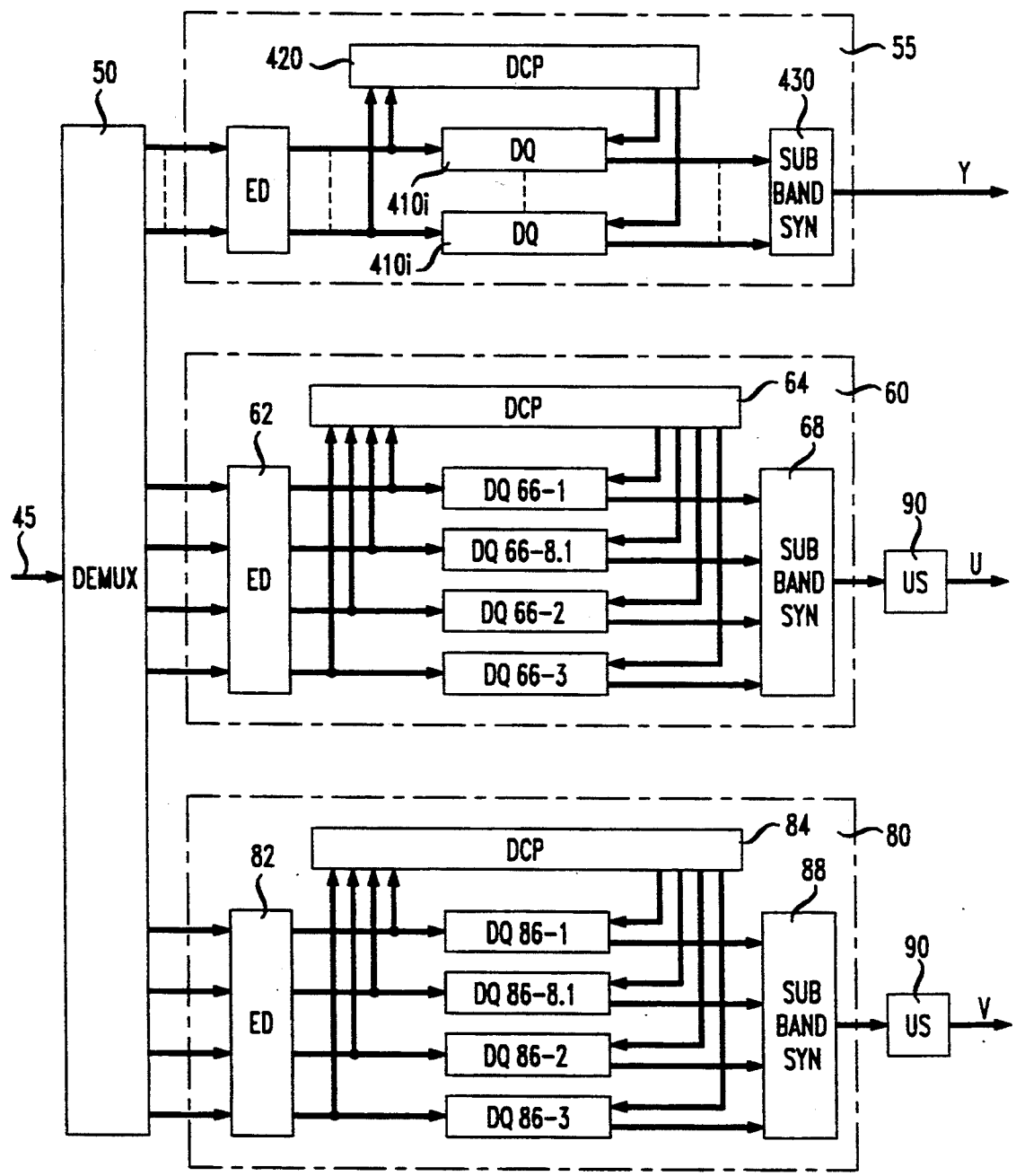
FIG. 4 presents an illustrative digital image decoder embodiment of the present invention.

FIG. 4 presents an illustrative receiver/decoder embodiment for use with the encoder embodiment of FIG. 1. The embodiment receives coded signals (and side information) from channel 45 and provides uncoded (or "synthesized") video signals in the YUV color video format. The coded signals from channel 45 are separated into the luminance (Y) and the two chrominance signals (U,V) by demultiplexer 50. The individual coded subband signals are presented to individual decoding sections 55 (for the Y component), 60 (for the U component) and 80 (for the V component). The Y subband components are decoded according to the first illustrative decoder embodiment of the above-referenced U.S. patent application Ser. No. 07/832,256.

The U and V sequences of coded subband chrominance frames are decoded by decoders 60 and 80, respectively, which are functionally and structurally identical for the sake of clarity, only the operation of decoder 60 will be described.

The coded sequence of U chrominance subband frames are received by entropy decoder 62 which performs the inverse of the process provided by entropy coder 18. These subband frames are then provided to dequantizers 66 and dequantizer control processor 64. Processor 64 uses received side information to determine which pixels are to be decoded based on coded information and which are to repeat previously decoded pixel values (i.e., which pixels are to be replenished). Decoded Pixels are provided on a subband basis by dequantizers 66. These dequantizers perform the inverse of the coding provided by quantizers 16 of FIG. 1. Dequantizers 66 comprise sufficient frame memory to perform replenishment.

Once subband frames have been generated, they are combined by subband synthesis filter 68 to produce a U chrominance component. Filer 68 performs the inverse of the filterbank process 12 discussed above. The U chrominance component is then upsampled by conventional up-sampler 90 to bring the U chrominance image to full size.

The above embodiments can be adapted to other frameworks besides the one illustrated in FIG. 3 allowing for a greater control over which subbands are perceptually most significant and which areas of the image are perceptually most significant. Also, while the above embodiments are presented for use with video signals of the standard YUV format, it should be understood that the invention is applicable to other color video formats as well, such as the YIQ format, the RGB format, etc.. In the case of the YUV and YIQ formats, the U, V, I and Q components are referred to as either "chrominance" or "color" components, while the R, G, and B components are referred to as "color" components.

We claim:

1. A method of coding a color component of an image signal sequence, the image signal sequence comprising a plurality of image signals, the method comprising the steps of:

filtering the color component of the image signal sequence into a plurality of subband image signals, the filtering step including generating a signal reflecting a high-pass temporal filtering of the color component of the image signal sequence;

coding one or more pixel signals of a first subband image signal, the first subband image signal reflecting an image structure of the color component of the image signal sequence; and coding one or more pixel signals of a second subband image signal, the second subband image signal reflecting image object motion information of the color component of the image signal sequence, the second subband image signal further reflecting substantially the lowest quarter of the vertical spatial frequencies and substantially the lowest quarter of the horizontal spatial frequencies included in the signal reflecting a high-pass temporal filtering of the color component of the image signal sequence.

2. The method of claim 1 wherein the image structure reflects low spatial and temporal frequencies of the color component of the image signal sequence.

3. The method of claim 1 wherein one or more pixel signals of the second subband image signal are selected for coding responsive to signal energy reflected in said one or more pixel signals.

4. The method of claim 3 wherein the signal energy reflected in said one or more pixel signals exceeds a threshold.

5. The method of claim 1 further comprising the step of generating a first signal so that one or more pixel signals of the first subband image signal may be represented by one or more previously decoded first subband pixel signals.

6. The method of claim 5 wherein the generating step comprises a step of comparing a first subband pixel signal with a previous first subband pixel signal to determine whether a difference between the compared signals satisfies an error criterion.

7. The method of claim 1 further comprising the step of:

coding one or more pixel signals of a third subband image signal, the third subband image signal reflecting edges of moving image objects.

8. The method of claim 7 wherein the third subband image signal reflects substantially vertical edges of moving objects.

9. The method of claim 7 wherein the third subband image signal reflects substantially horizontal edges of moving objects.

10. The method of claim 7 wherein one or more pixel signals of the third subband image signal are selected for coding responsive to signal energy reflected in said one or more pixel signals.

11. The method of claim 1 wherein the color component is a chrominance component.

* * * * *